United States Patent [19]

Wilner

[11] Patent Number: 4,605,919
[45] Date of Patent: Aug. 12, 1986

[54] PIEZORESISTIVE TRANSDUCER

[75] Inventor: Leslie B. Wilner, Palo Alto, Calif.

[73] Assignee: Becton, Dickinson and Company, Franklin Lakes, N.J.

[21] Appl. No.: 652,693

[22] Filed: Sep. 21, 1984

Related U.S. Application Data

[62] Division of Ser. No. 432,620, Oct. 4, 1982, Pat. No. 4,498,229.

[51] Int. Cl.$^4$ .............................................. G01L 1/22
[52] U.S. Cl. ........................................... 338/2; 338/5; 338/46; 73/777; 73/862.65; 357/26
[58] Field of Search ................................ 338/2, 5, 46; 73/862.65, 862.62, 517 R, 777; 357/26

[56] References Cited

U.S. PATENT DOCUMENTS

| | | | |
|---|---|---|---|
| 3,351,880 | 11/1967 | Wilner | 357/26 X |
| 3,392,358 | 7/1968 | Collins | 338/2 |
| 3,444,499 | 5/1969 | Lovelace | 357/26 X |
| 3,492,513 | 1/1970 | Hollander | 338/2 X |
| 3,897,627 | 8/1975 | Klatskin | 29/583 X |
| 3,995,247 | 11/1976 | Kurtz | 338/6 X |
| 4,047,144 | 9/1977 | Wong | 357/26 X |
| 4,065,970 | 1/1978 | Wilner | 338/4 X |
| 4,093,933 | 6/1978 | Wilner | 338/42 |
| 4,182,937 | 1/1980 | Greenwood | 73/777 X |
| 4,408,386 | 10/1983 | Takayashiki et al. | 29/576 E |

FOREIGN PATENT DOCUMENTS

| | | | |
|---|---|---|---|
| 1211499 | 11/1970 | United Kingdom | 29/610 SG |
| 1588669 | 5/1978 | United Kingdom | 357/26 |
| 1588699 | 4/1981 | United Kingdom | |

OTHER PUBLICATIONS

"Ethylene Diamino Pyrocatechol-Water Mixture Shows Etching Anomaly in Boron-Doped Silicon"; A. Bohg; Journal of the Electrochemical Society; Feb. 1971, p. 401.

Bretschi, "A Piezoresistive Semiconductor Transducer", Feinwerktechnik & Messtechnik, vol. 83, Oct.-/Nov. 1975, No. 7, pp. 333-339.

Primary Examiner—Clarence L. Albritton
Assistant Examiner—Marvin M. Lateef
Attorney, Agent, or Firm—Robert P. Grindle

[57] ABSTRACT

An electromechanical transducer is provided, and the process for making it, which utilizes a piezoresistive element or gage which is crystallinally the same as the base or substrate upon which it is supported. The gage of the invention is a force gage, and is derived from its substrate by etching in a series of steps which, ultimately, provide a gage with substantially reduced strain energy requirements, because the volume of the gage may be as small as $3 \times 10^{10}$ cubic centimeters of stressed material. In its most preferred form, the element or gage is etched free of its substrate to provide, in effect, a "floating gage." This is achieved by defining the gage in its substrate or in material rigidly bonded to its substrate, etching away immediately adjacent material, and leaving the gage free in space, while supported at each end on the substrate.

10 Claims, 15 Drawing Figures

PIEZORESISTIVE TRANSDUCER

This is a division of application Ser. No. 432,620, filed Oct. 4, 1982 now U.S. Pat. No. 4,498,229 issued 2/12/85.

BACKGROUND AND STATEMENT OF THE INVENTION

Generally speaking, this invention relates to electromechanical transducers for converting mechanical movements or displacements into electrical signals. More particularly, this invention relates to an improved strain sensitive element or force gage for use in such mechanical transducers.

In electromechanical transducers of the kind to which the present invention is directed, a transducing element is utilized for detecting the relative displacement of two parts and for developing a corresponding electric signal. Generally, such relative displacements have been measured in the past with various kinds of strain gages. However, these have a tendency to be of considerable weight, some of which are very bulky, some of which are not very sensitive. Those that are have intricate designs which are very expensive. As mentioned above, the present invention is directed to a force-type sensor or gage which is mounted between two parts between which a force is applied. The gage is, therefore, strained in an amount which depends upon that force. It is substantially smaller than prior art force gages, is relatively simple in structure, is easily manufactured, and is, therefore, less expensive.

As such piezoresistive transducers have developed in use over the years, it has become increasingly desirable to have extremely small sensors of high sensitivity and low bulk. However, in order to develop force gages which are of extremely small size, difficulties arise in the handling thereof for subsequent mounting upon their substrate, once they are developed. They are difficult to handle not only because of their small size, but also because of their fragility.

One of the primary advantages of force transducers lies in the fact that the displacement between the pads at each end thereof produced by relative motion of the two parts to which the pads are attached is concentrated in the "suspended", so to speak, portion of the force gage which can mechanically amplify the strain being sensed or measured. Furthermore, the resistance change of the element per unit displacement is greatest as the length of the element is reduced. By use of both short gage lengths and appropriate leverage very large resistance changes may result from very small displacements. This change in resistance is determined by means of electrical current flowing through the element from one pad to the other, and measuring changes in voltage or other electrical properties resulting from changes in resistance. However, when attempts are made to reduce to a smaller size such force gages, then, as mentioned above, difficulties arise relative to the handling thereof in mounting upon their substrates, as well as other problems which ordinarily arise in handling very small objects.

With this invention, by contrast, strain sensitive elements are provided in the form of force gages which are derived from the substrate upon which they are subsequently supported in use. That is, the gages are defined upon the substrate or marked thereon, and subsequently etched right from the material of the substrate. In one form of force gage of the invention, the gage is etched to allow a small support or mesa underneath, while maintaining the gage still connected by this minute portion of the substrate to the substrate proper. In its preferred form, the invention is directed to a force gage which is etched free of its substrate along its length but continuous with it at its ends. Thus, the gages of the invention are crystallinally continuous with their support.

That is, force gages of substantially smaller strain volume are produced by defining the gage in the substrate or in material rigidly bonded to the substrate, and subsequently etching away the immediately adjacent material, leaving the gage free in space, after the fashion of force gages of the past, but supported against unwanted cross loads by remote portions of the substrate. Such gages may have a volume as small as $3 \times 10^{-10}$ cubic centimeters of stressed material, as opposed to present commercially available force gages wherein the strained volume is $5 \times 10^{-7}$ cubic centimeters. Both gages would typically be strained to one part per thousand. The strain energy is thus a thousandfold less for the smaller gage.

It will be appreciated, in this connection, that the volume of the gages formulated according to the invention here will vary widely depending upon ultimate use. For example, a "sturdy" gage may have $3 \times 10^{-4}$ times $8 \times 10^{-4}$ times $32 \times 10^{-4}$ centimeters or $10^{-9}$ cubic centimeters. On the other hand a delicate gage may have $0.3 \times 10^{-4}$ times $3 \times 10^{-4}$ times $12 \times 10^{-4}$ centimeters, or $10^{-11}$ cubic centimeters. It is within the purview of this invention to obtain a gage volume of $10^{-12}$ cubic centimeters utilizing electron beam lithography.

In considering the conditions generally for carrying out the process of the invention here for producing a force gage, a conventional silicon crystal material is selected, and the outline of the gage is etched on the selected crystal which forms the substrate. An etch is selected which is both anisotropic and doping-selective. Caustic, hydrazine, and pyrocatechol etchants may be selected, depending upon the results desired. They attack silicon rapidly in the [112] direction, moderately rapidly in the [110] direction, and very slowly in the [111] direction. With this invention, the substrate orientation is in the (110) plane and the [111] direction along the gage so as to define a groove over which the gage extends. With such orientation, a groove is produced with walls which are nearly vertical, and with floors that are nearly flat.

The same etchants which are anisotropic are dopant selective, in that they attack very slowly silicon in which a boron concentration is developed which is greater than $5 \times 10^{19}$/cc. In accordance with the process of the invention, the gage is defined and its terminals are also defined by a planar diffusion or ion implantation through an oxide mask to a boron concentration of roughly $10^{20}$/cc. The boron makes the gage P-type, while the substrate is N-type. The diffused area is electrically isolated from the substrate by a P-N junction. During the etching procedure which forms the groove, the gage is exposed to the etchant, but is resistant to it. As will be appreciated, and explained further herein, when the groove is defined over which the gage extends, a hinge is also defined in the substrate around which one end of the substrate moves relative to the other to develop the strain being monitored by the sensor. Also, the hinge protects the gage against transverse loads.

As a further feature of the invention, two substrate wafers may be bonded together. Grooves may be formed either before or after bonding of the wafers. If the groove is formed by impact grinding, it must be formed before bonding. Gages and their terminals may be defined in the gage wafer by doping them to the requisite high concentration of boron before bonding the wafers, then etching away all of the undoped portion of the gage wafer. Alternatively, the whole bonded surface of the gage wafer may be doped with boron so that the etching leaves a continuous sheet of gage material from which gages may be etched by a subsequent photolithographic step. This is similar to the bonded wafer approach described and claimed in co-pending U.S. application Ser. No. 233,728, filed Feb. 12, 1981, now U.S. Pat. No. 4,400,869 issued Aug. 30, 1983 which application is owned by the assignee of this application and which application is incorporated by reference herein in its entirety.

For example, the gage wafer will still be (110) [111], while the hinge wafer is (100) [110] for easy and precise etching. This gives less difference in strain on the gages and the associated hinge surface than does the square etch pattern on the (110) plane. Once the two wafers are bonded together, with the gages positioned over their appropriate grooves or apertures which have been defined in the wafers, then the gages are freed by etching away all of the gage wafer except the gages and their terminals. This approach is more complex in its execution, but offers dialectric isolation of the gages, rather than diode isolation. Also, this allows the use of different crystal orientations in the gage and substrate wafers. Of course, this approach departs from one of the primary aspects of this invention which is having the crystal structure of the gage the same as its substrate support.

A piezoresistive transducer developed in accordance with the general procedures noted above is particularly appropriate for use in accelerometers, pressure transducers, and displacement gages. The length of each individual gage produced in accordance herewith, will be generally about 25 microns, while the width will be about 6 microns.

The general steps or procedure involved in fabricating a piezoresistive transducer dice for use in an accelerometer includes first selecting a silicon wafer. In this connection, it should be understood that a plurality of sensor are produced in a single wafer depending upon the form of sensor being developed in any particular application. Subsequently, the individual sensors are diced out of the wafer, once the sensors have been formed with their gages, in accordance with this invention. After the wafer is selected, it is heavily oxidized. Subsequently, index marks are imposed on either side of the wafer photolithographically in order to align the patterns on each side of the wafer. It should be pointed out here, that with respect to each die formed on a wafer, gages may be formed on one or both sides of the wafer, again depending upon the form of sensor being developed for a particular application.

Subsequent to imposing the index marks on each side by photolithographic means, apertures are opened in the oxide layer which are to be heavily doped to define the gages and conductors therefore. After this is done, boron is implanted into the open areas on both sides in the amount of $1.5 \times 10^{16}$ cm$^2$, sufficient to obtain boron in the amount of at least $5 \times 10^{19}$ atoms per cubic centimeter, and a depth within the range of between about 0.1 and 3 micrometers. The implantation should provide nearly equal doping on both sides. Subsequent to the implantation of the boron, the silicon wafer is annealed at a temperature of 920° C. for about one hour. In this connection, for a more detailed discussion about general procedures of the kind carried out and discussed here, reference is made to the above noted co-pending U.S. application Ser. No. 233,728. The same boron doping can be achieved by planar diffusion.

Once the annealing procedure has taken place, the etching patterns are opened on both sides photolithographically. Thus, the wafer is prepared for the etching procedure. Etching may be done by a potassium hydroxide-water-isopropyl alcohol bath. Preferably, however, an ethylene diamine-pyrocatechol etch is utilized. In this connection, during this etching procedure, areas protected by oxide and areas heavily doped with boron do not etch. The etching procedure takes approximately four hours. Preferably, etching is to a depth of about 0.0022 inches assuming a wafer of 0.005 inches to leave a central hinge of 0.0006 inches. The depth should be sufficient to obtain a substantially level bottom surface of the groove below the gages. Also, depth should be sufficient that residual thickness at the bottom of the groove, considered as an elastic hinge, represents a small fraction of the bending stiffness in a system consisting of the formed hinge and its gage.

Once the etching procedure has taken place, all of the previously applied oxide is stripped and a thin oxide layer is grown on the wafer to protect the P-N junctions. Once this has taken place, aluminum is deposited on one or both sides to provide the metallic connections for the individual gage or gages. In this connection, once the aluminum has been deposited, then the patterns of the aluminum for forming the contact areas are photolithographically defined on the wafer. Subsequently, the wafer is cut into the individual dice with a diamond saw.

With the foregoing and additional objects in view, this invention will now be described in more detail, and other objects and advantages hereof will be apparent from the following description, the accompanying drawings, and the appended claims.

DETAILED DESCRIPTION OF THE INVENTION

Figure 1:
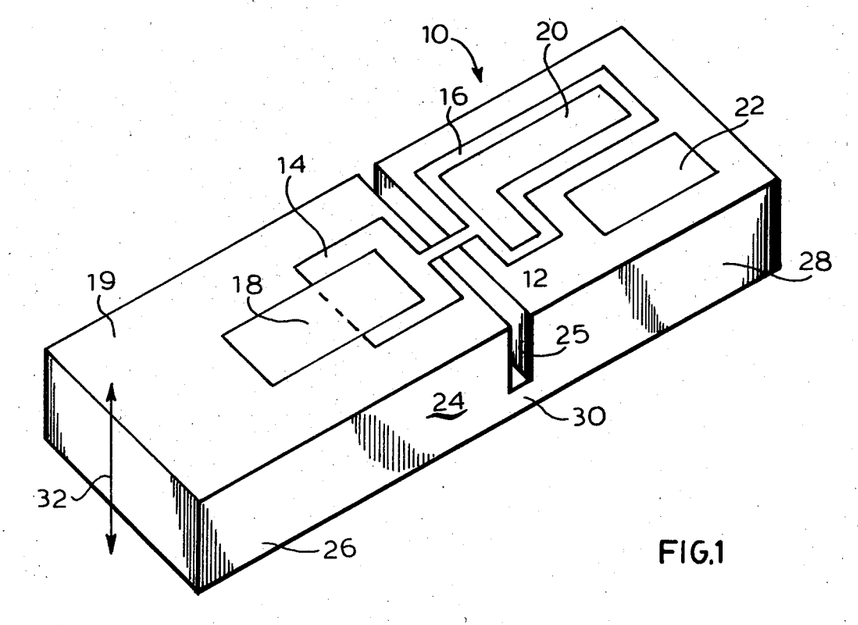
FIG. 1 is a view in perspective of a piezoresistive transducer illustrating the invention in which a single gage is arranged on one side of its respective substrate.

Referring to the drawings in which like reference characters refer to like parts throughout the several views thereof, FIG. 1 illustrates a piezoresistive transducer 10, illustrating the invention, with a substrate 24 having a groove 25 defined therein undercutting the gage 12. As can be seen in FIG. 1, gage 12 extends over groove 25 to pads 14, 16 at each end thereof. 18 is a connection between gage pad 14 with the end 19 of substrate 24, while 20 is the opposite link or connection 20 maintaining contact with gage pad 16. 22 is the contact to the substrate end 28. As will be appreciated, groove 25 defines a hinge 30 between the fixed end 28 of substrate 24, and the movable end 26 thereof. A force is applied in the direction of arrow 32 on movable end 26, which causes movable end 26 to move around hinge 30 relative to fixed end 28, thus creating a strain in gage 12, which is measured electronically, as discussed above.

Once the sensitive elements or gages are formulated in the manner of the invention here, they may be mounted in an electronic circuit for connection to a recording system depending upon the ultimate application of the circuitry. For example, for use in a pressure transducer system, the gages of the invention may be mounted in a Wheatstone bridge circuit in a pressure sensor similar to that shown in U.S. Pat. No. 4,065,970.

Figure 2:
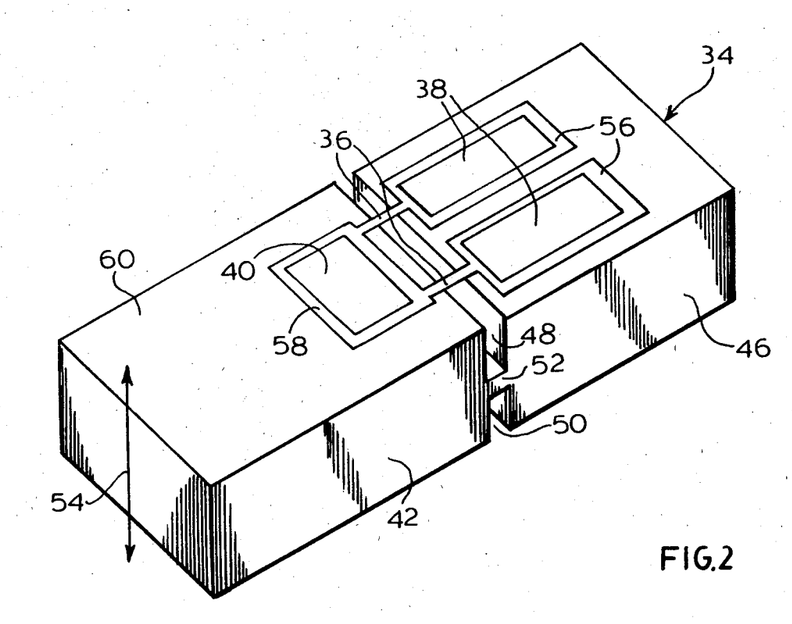
FIG. 2 is a view in perspective of a further embodiment of piezoresistive transducer illustrating the invention in which two force gages are arranged on one side of the substrate.

Referring to FIG. 2, piezoresistive transducer 34 is shown with dual gages 36 formed on the top surface 60 thereof in accordance with the general procedures discussed above. The dual gages 36 end at one end thereof in pad 58 positioned on movable end 44 of substrate 42, while gages 36 have individual pads 56 positioned on the fixed end 46 of substrate 42. The pads 56 have electrical contact terminals 38 positioned thereon, while pad 58 has area 40. Metallic area 40 is formed to reduce electrical resistance of pad 58 between the adjacent ends of gages 36. It is not necessary to the structure shown. The areas 38 and 40 may be comprised of aluminum, as will be appreciated from the above discussion.

As can be seen in FIG. 2, hinge 52 is positioned midway between the top and bottom surface of substrate 42, as opposed to the arrangement shown in FIG. 1. Thus, an upper groove 48 and a lower backside groove 50 are formed to define hinge 52. It is to be understood, from the showing in FIG. 2, that a gage pattern similar to that shown on top surface 60 of substrate 42 may be formed on the bottom surface thereof with the gage pattern being nominally identical to that shown. The gage patterns will be isolated from the substrate and from each other by the PN junctions. This arrangement is derived from the general processing conditions and steps noted above.

Figure 3A:
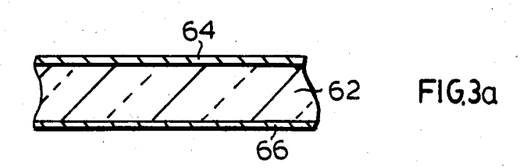
FIGS. 3a-3j are somewhat diagramatic views, in section, illustrating the sequential processing conditions of the invention, as the wafers are processed in accordance with this invention.
Figure 3B:
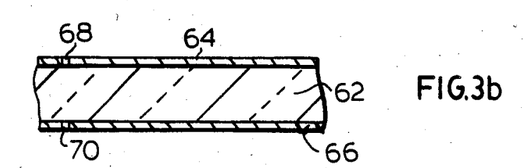
Figure 3C:
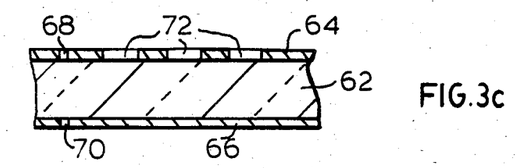
Figure 3D:
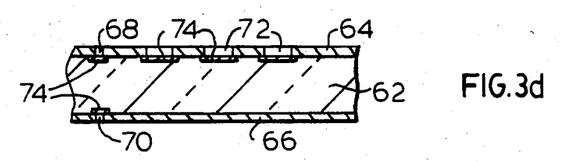
Figure 3E:
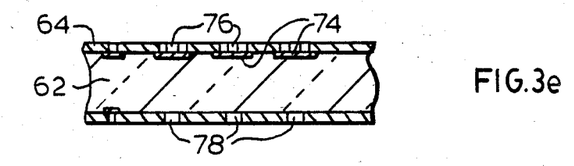

Referring now to FIGS. 3a-3j, a sequence of steps is shown for processing a single sided freed or suspended gage piezoresistive transducer arrangement herein. Thus, as shown in FIG. 3a, substrate 62 has formed thereon an oxidized layer 64 on top and an oxidized layer 66 on the bottom surface. Subsequent to the oxidizing step, indices are coordinated for processing both the top surface 64 and the bottom surface 66 of the substrate 62 by forming the coordinated indices 68, 70 therein. As can be seen in FIG. 3c, top surface 64 is opened for doping at 72. Thereafter, boron from $B_2O_3$ is diffused into the open apertures to a concentration of $10^{20}$ boron/cc, which might give a sheet resistance of 6 ohms per square, for example. FIG. 3d shows the diffused boron 74 in the open areas 72, as well as in the index pattern 68.

Figure 3F:
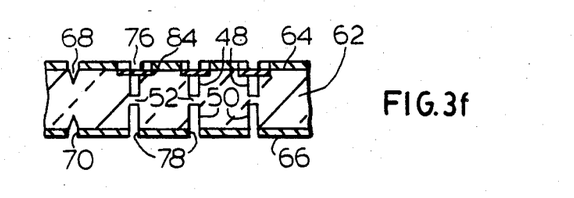

Following the boron diffusion step, both sides of substrate 62 are opened, as shown at 76, 78, respectively, (FIG. 3e) with an etching pattern for the subsequent etching procedure. Subsequently, the etching procedure is carried out, preferably with the ethylene diamine-pyrocatechol etch, as discussed above. The etch takes place to a depth of 0.0022 to 0.0050 inches to undercut the gages and leave a hinge of a thickness of about 0.0006 inches. As can be seen in FIG. 3f, the etching forms grooves 48, 50 to define a hinge 52 at each point of etch. Also, as can be seen in FIG. 3f, the coordinated index pattern arrangement 68, 70 is affected by the etch. In this connection, the original index marks are made immune to etching by boron doping. Index images may or may not open new index areas to the etch, as desired. The formed gages 84, as can be seen in FIG. 3f extend over grooves 48 in a manner similar to that shown in FIG. 2.

Figure 3G:
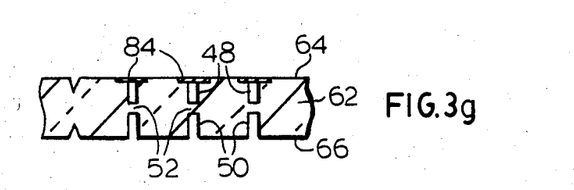
Figure 3H:
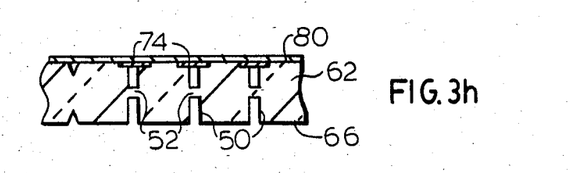
Figure 3I:
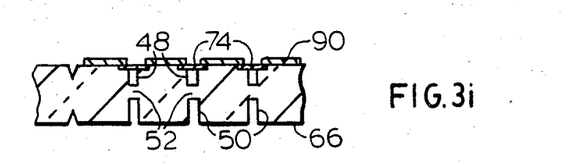
Figure 3J:
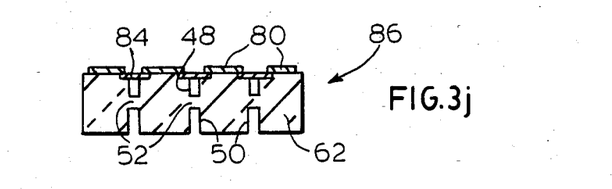

Subsequently, the used oxide is stripped from the substrate 62 and a thin oxide coating is grown on both surfaces 64, 68 to form the arrangement as shown in FIG. 3g. Following the growth of a thin oxide layer, a metal layer 80 is deposited on the top surface 64 of substrate 62, as shown in FIG. 3h. The aluminum or metalized deposit 80 is then patterned to define the contacts or connecting links of the pads formed at each end of the gages. Finally, the individual dice are cut from the wafer having been processed in accordance with the procedure discussed above, with the individual dice being in a form similar to that shown at 86 in FIG. 3j.

As a further feature of this invention, particularly for low cost, high sensitivity pressure sensors, the relative ruggedness of a gage on its own support extending across the groove has been found to be preferable to a fully freed or "floating" gage. The strain energy needed for such a "mesa" supported gage is about three times that needed for a freed gage, but the resistance to handling damage is less expensive, as will be appreciated. Thus, if the etching is done into a (100) crystal surface, the walls of the etched cavities are 35° to 45° from vertical. Conductive metallic flims may be deposited and patterned up and down these slopes, which define a mesa supporting the gages. When etching into the (100) plane gages are aligned in the [110] direction, as required for highest gage factor, the gages will not be undercut, as discussed above but will persist on mesas to give gages of relative ruggedness.

Figures 5, 6:
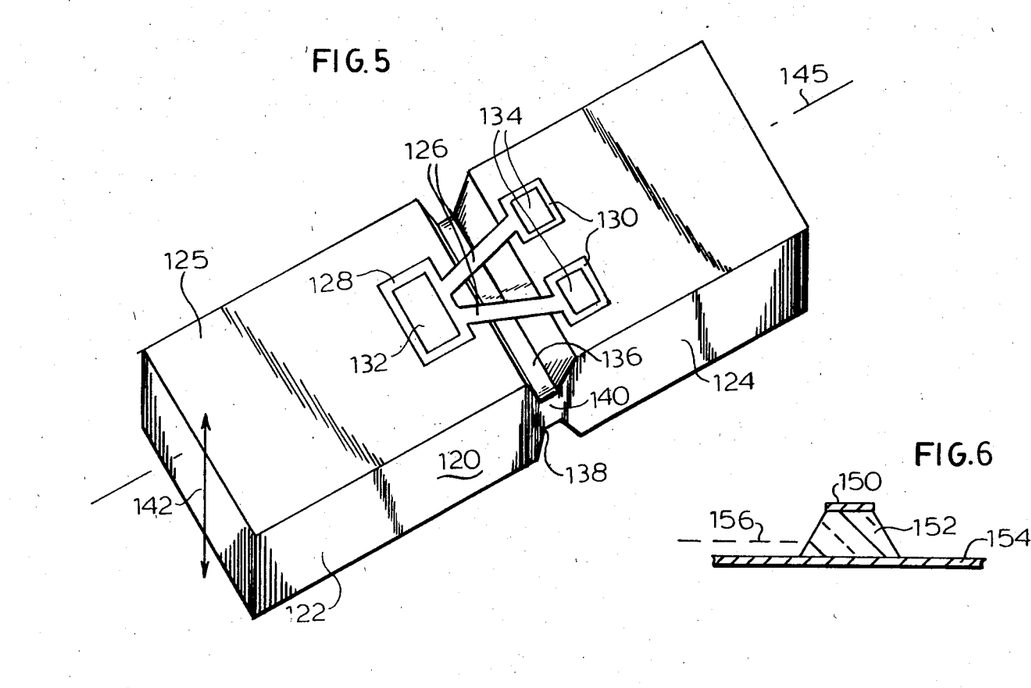
FIG. 5 is a view in perspective of a still further embodiment of the invention illustrating a form of invention in which the gages are etched offset from the principal crystal direction.
FIG. 6 is a view in section of a mesa supported gage illustrating a further embodiment of the invention.

FIG. 6 illustrates this form of invention in section in which gage 150 is supported on its related mesa 150 above groove plane 154. In this form, a neutral axis of bending 156 is formed near the hinge plane 154.

If, on the other hand, it is preferable to have the gages etch-freed in this plane if they are "misaligned", offsetting one end of a gage by at least the gage's width will allow the etching to undercut the gage. Some additional angling of the gage may be needed to allow the etch to smooth out the space defining the groove under the gage. The angled gage has a width of about 7.5 microns, a length of 37.5 microns, a depth of 15 microns and a flat bottom width of about 15 microns.

The penalty for angling the gage off the principal crystal direction [110] is a reduction in gage factor. For example, a 13° angle to the gage reduces gage factor 19%. This is a relatively small penalty compared to the gain in sensitivity resulting in removal of the underlying material. FIG. 5 is representative of a structure of the kind discussed above in which gages 126 are angled relative to the principal axis 145 of substrate 120. As can be seen in FIG. 5, the applied force, as indicated by arrow 142, is against the movable end 122 of substrate 120 on hinge 140 around the fixed end 124 of substrate 120. Hinge 140 is defined by upper and lower grooves 136, 138 respectively. In this particular sensor element configuration, gages 126 end in a single pad 128 at one end thereof while each individual gage 126 ends at the other end thereof in individual pads 130. Aluminum connections 132, 134 are deposited on these pads.

Figure 4:
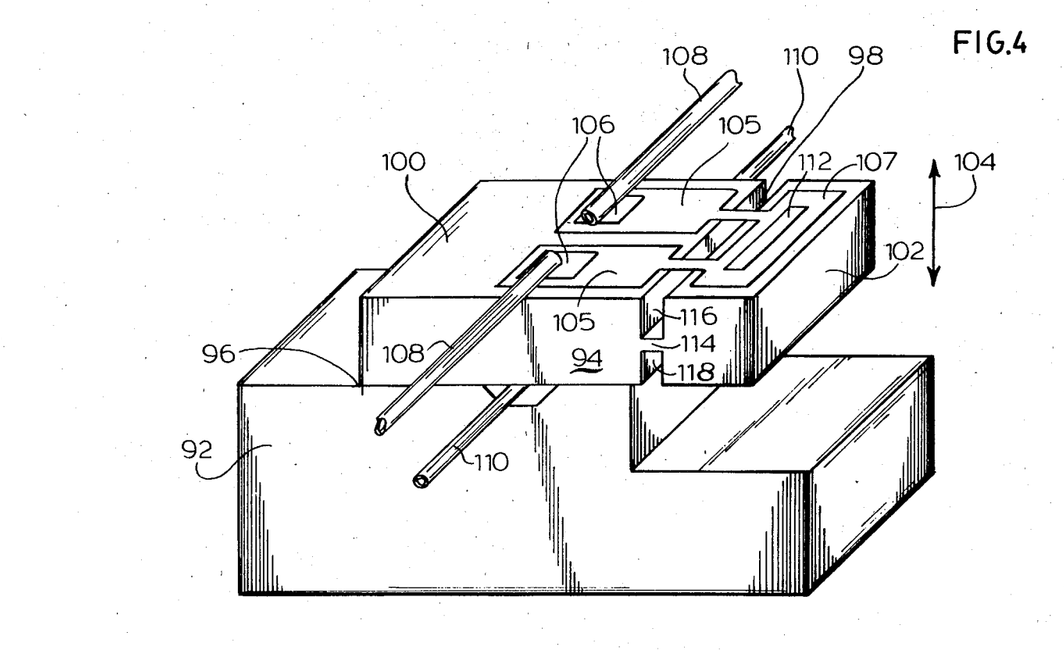
FIG. 4 is a view in perspective of a further embodiment of the invention in which the gages are etched upon a cantilevered support.

As a further feature of the invention, a cantilevered sensor may be utilized. FIG. 4 shows an embodiment of sensor utilizing the cantilever. Thus, referring to FIG. 4, sensor 94 is shown mounted on a base block 92. Sensor 94 may be mounted to base block 92 through the use of a clamp or the two parts may be bonded together using an adhesive. Sensor 94 has a fixed end 100 bonded to base block 92, while the movable end 102 is cantilevered from sensor 94. Thus, movable end 102 reacts to forces in the direction of arrow 104 around hinge 114 defined by upper and lower grooves 116, 118 respectively. Gages 98 are subjected to the strain during this movement in one direction and the electrical signal therein is picked up by contacts 106, 112 deposited on the pads 105, 107 respectively at each end of gages 98. This particular form of sensor includes identical gages deposited on the bottom surface of sensor 94 for sensing movement of end 102 in the reverse direction of force 104. Thus, leads 108 extend from contacts 106 while leads 110 extend from contacts deposited on the lower surface of sensor 94 and in contact with gages mounted thereon. The assembly shown in FIG. 4 may be employed as an accelerometer, for example, wherein the inertial force of the end 102 is the force measured by the system.

As will be appreciated from the above discussion the invention herein provides a process, and a product produced from that process, of piezoresistive transducers utilizing sensor elements with gages produced in situ on their substrates, which process and the resulting product allows the use of stressed volumes of material smaller by a factor of hundreds from the stressed volumes previously thought practical. This increased sensor sensitivity can be applied to various types of transducers to produce very improved performance. Accelerometers utilizing the sensor of the invention have an extremely high range, for example. A conventional accelerometer, for example, is calculated to have a resonance frequency of 161 KHz for a sensitivity of 1 microvolt per volt. By contrast, an etch-free gage arrangement in an accelerometer in accordance with this invention has a resonance frequency of 1.28 MHz for the same sensitivity. Furthermore, pressure transducers are developed of substantially smaller size with much greater sensitivity, high resonance frequency and good linearity, because of the small deflections required.

These sensing elements of the invention can be readily fabricated by mass production techniques, because they are formulated in situ, thus reducing the amount of handling necessary, particularly with respect to mounting the gages therefor on the supporting substrates. This makes the methods and the product produced by those methods in accordance with this invention highly advantageous commercially, particularly with respect to the substantial decrease of required material needed for the stressed volume in the sensors.

While the methods and products produced by the methods herein disclosed form preferred embodiments of this invention, this invention is not limited to those specific methods and products, and changes can be made therein without departing from the scope of this invention which is defined in the appended claims.

What is claimed is:

1. In a device for converting mechanical movement of two relatively movable parts of a mechanical device into electrical signals, characterized by
    (a) a substrate comprised of piezoresistive semi-conductive material with the crystal orientation thereof being substantially in the (110) plane;
    (b) groove means extending across said substrate defining said relative movable parts, and a hinge extending therebetween;
    (c) the opposed walls of said groove means being in planes parallel to each other and at right angles to the floor of said groove means; (d) at least one strain sensitive element extending across said groove means and perpendicular thereto;
    (e) the crystal orientation of said at least one strain sensitive element being indexed substantially in the [111] direction;
    (f) said at least one strain sesitive element being a unitary member having two end portions interconnected by and separated by an intermediate neck portion;
    (g) said at least one unitary strain sensitive element being derived from the same piezoresistive semi-conductive material as said substrate;
    (h) said end portions and said neck portion of said at least one strain sensitive element lying on a common axis;
    (i) each of said end portions joined to one of said relatively movable parts of said substrate; and
    (j) electrode means electrically connected to said end portions for detecting changes in electrical resistance between said end portions when said neck portion is subjected to stress resulting from relative movement of said substrate parts.
2. The device of claim 1, further characterized by
    (a) said neck portion being 25 microns long, and 6 microns wide.
3. The device of claim 1, further characterized by
    (a) said hinge being about 0.0006 inches thick.
4. The device of claim 1, further characterized by
    (a) said strain sensitive element has a strain volume of $3 \times 10^{-10}$ cubic centimeters of stressed material.
5. The device of claim 1, further characterized by
    (a) said groove means is a single groove extending from one surface of said substrate to said hinge.
6. The device of claim 5, further characterized by
    (a) a plurality of spaced apart strain sensitive elements extending across said groove; and
    (b) the end portions of said plurality of strain sensitive elements being electrically interconnected by said electrode means.
7. The device of claim 1, further characterized by
    (a) said groove means is composed of two opposed spaced apart grooves extending toward each other from the top and bottom surface of said substrate to define said hinge.
8. The device of claim 7, further characterized by
    (a) a plurality of spaced apart strain sensitive elements extending across said grooves on the top and bottom surface of said substrate; and (b) the end portions of said plurality of strain sensitive elements being electrically interconnected by said electrode means.

9. The device of claim 1, further characterized by
(a) the said axis of said strain sensitive element being parallel with the axis of said substrate.

10. The device of claim 1, further characterized by
(a) said unitary strain sensitive element being etched free from said substrate; and
(b) said end portions of said strain sensitive element being bonded to said substrate relative movable parts of said substrate.

* * * * *